United States Patent [19]

Sekine et al.

[11] Patent Number: 5,258,965
[45] Date of Patent: Nov. 2, 1993

[54] PHOTO-MAGNETIC DISK DRIVING APPARATUS

[75] Inventors: Takehiko Sekine; Mitsuru Watanabe, both of Hachioji, Japan

[73] Assignee: Konica Corporation, Tokyo, Japan

[21] Appl. No.: 658,382

[22] Filed: Feb. 20, 1991

[30] Foreign Application Priority Data

Feb. 28, 1990 [JP] Japan .................. 2-49085
Feb. 28, 1990 [JP] Japan .................. 2-49086
Feb. 28, 1990 [JP] Japan .................. 2-49090

[51] Int. Cl.$^5$ .................. G11B 13/04; G11B 11/12; G11B 11/10
[52] U.S. Cl. .................. 369/13; 360/114; 360/137
[58] Field of Search .................. 369/13, 77.2, 75.2; 360/59, 114, 66, 137, 103

[56] References Cited

U.S. PATENT DOCUMENTS

| | | | |
|---|---|---|---|
| 4,837,758 | 6/1989 | Motoyama et al. | 369/13 |
| 4,984,225 | 1/1991 | Ando | 369/13 |
| 4,993,009 | 2/1991 | Shiho | 360/114 |
| 5,027,334 | 6/1991 | Yamanaka et al. | 360/114 |
| 5,060,207 | 10/1991 | Kaneda et al. | 360/114 |
| 5,103,435 | 4/1992 | Nemoto et al. | 360/114 |

Primary Examiner—Hoa T. Nguyen
Attorney, Agent, or Firm—Finnegan, Henderson, Farabow, Garrett & Dunner

[57] ABSTRACT

Photo-magnetic disk driver for recording, playing back, or erasing information on a photo-magnetic disk in a cartridge. The disk driver has a driver to rotate the photo-magnetic disk at a driving position, a generator of a magnetic field having a direction perpendicular to a surface of the photo-magnetic disk, a laser beam generator to irradiate a laser beam onto the disk surface so that the temperature of the irradiated portion of the surface is increased, a disk receiver of the cartridge. This disk driver includes a loading path to the driving position, and a support for moving the generator between a first position where the generator is inserted into the loading path, and a second position where the generator is outside of the loading path, wherein the generator is at the first position before the cartridge is received by the receiver.

6 Claims, 16 Drawing Sheets

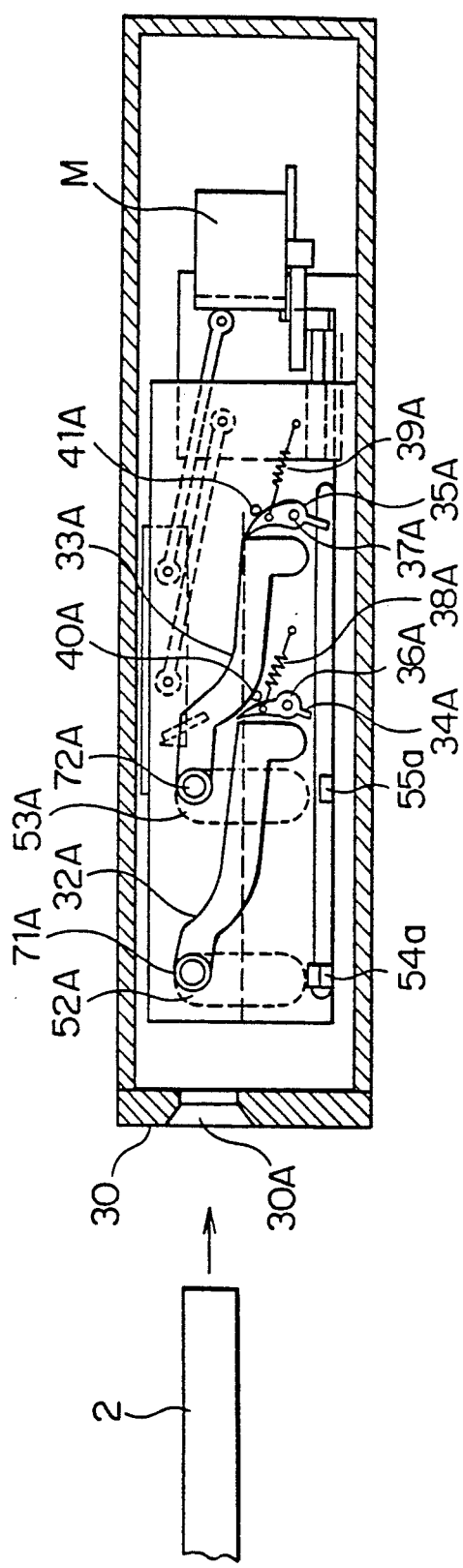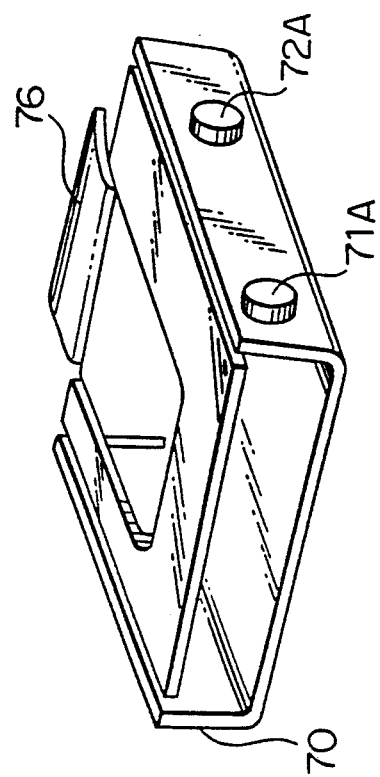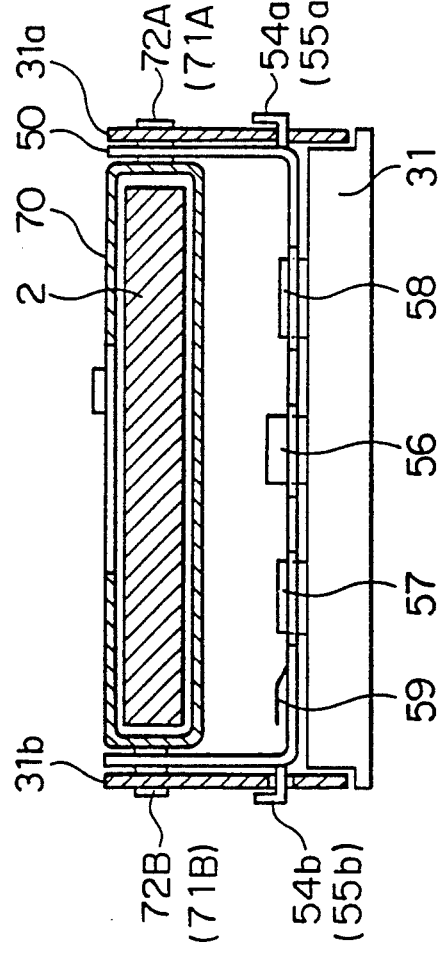

PHOTO-MAGNETIC DISK DRIVING APPARATUS

BACKGROUND OF THE INVENTION

The present invention relates to a photo-magnetic disk driving apparatus having therein an improved device for generating an external magnetic field perpendicular to a medium for recording or erasing information, in a photo-magnetic recording apparatus.

In the photo-magnetic recording apparatus wherein a magnetic field of a certain level is applied on a recording medium, such as a photo-magnetic disk, recording or erasing of information is made by causing the direction of residual magnetization on the recording medium to be the same as that of magnetization of a magnetic field applied concurrently through the method of applying laser beams on the recording medium and heating partially beyond a Curie point.There is needed an external magnetic field generating device with which the point in the vicinity of an optical spot formed on the medium is put in a certain magnetic field whose direction in recording is opposite to that in erasing. In the past, in order to change a direction of an external magnetic field to be applied on a recording medium for recording or erasing in a photo-magnetic recording apparatus, a method for switching a direction of an electric current running through a coil by the use of an electromagnet, or a method for rotating a permanent magnet mechanically or moving it in parallel has been used.

Namely, a direction of magnetization at a laser-applied portion is changed, for recording or erasing, by a magnetic field generated by energizing a coil (electromagnet). For recording, laser beams are applied on a recording medium by which a temperature at the laser-applied portion is raised, and at the same time, a bias magnetic field is applied by an external magnetic field generating device. For playing back, photo-magnetic effects of aforesaid recording portion are used.

FIGS. 7 (A) and 7 (B) show a conventional photo-magnetic disk driving apparatus in which a photo-magnetic disk is loaded. FIG. 7 (A) represents a top view, FIG. 7 (B) represents a sectional view taken on line at the center of the top view. FIG. 8 represents an exploded perspective view of the photo-magnetic disk driving apparatus and of the photo-magnetic disk.

In these figures, the numeral 1 is a photo-magnetic disk, 2 is a cartridge containing the disk, and 3 is a shutter (cover) for opening or closing the opening 2A on the cartridge 2. A hub portion of aforesaid photo-magnetic disk 1 can be mounted detachably on clamper 5 positioned on the top end of spindle motor shaft 4 of a driving apparatus in a photo-magnetic recording apparatus.

When either recording or erasing is made in aforesaid photo-magnetic recording apparatus, external magnetic field-generating device 6 in the apparatus is lowered so that it comes near the recording face of photo-magnetic disk 1. Aforesaid external magnetic field-generating device 6 is located so that it faces optical head 7 with the photomagnetic disk between them, and it is composed, in the access direction of optical head 7, of yoke 6A having a length to cover the scanning area of optical head 7 and exciting coil 6B wound around the yoke.

Aforesaid optical head (optical pick-up portion) 7 is composed of objective lens 7A, actuator portion 7B, laser diode portion 7C and photo-detector portion 7D, and it is mounted on carriage 12, which is capable of moving from side to side along two guide bars 11 placed in parallel on stationary base 10 of the photo-magnetic recording apparatus. The carriage 12 travels straight, being powered by thrust-generating device 13 composed of magnetic circuit 13A and driving coil 13B.

Next, FIGS. 9 (A) and 9 (B) show a cassette-loading mechanism in the vicinity of an external magnetic field-generating device in a conventional photo-magnetic disk driving apparatus, wherein FIG. 9 (A) represents a front view and FIG. 9 (B) represents a top view.

In these figures, the main structural members of the cassette loading mechanism are stationary base 10, movable base 20, cartridge-holder 21, DC motor M for loading, external magnetic field-generating device 6, movable base sliding mechanism (unillustrated) and an opening and closing mechanism (unillustrated) for shutter 3 of cartridge 2.

FIGS. 9 (A) and 9 (B) show how cartridge 2 is inserted. Under such conditions, movable base 20 can move back and forth in the direction of arrow A on stationary base 10 along the unillustrated movable base sliding mechanism.

On both sides of cartridge-holder 21, roller 22A and 22B are supported rotatably. These rollers 22A and 22B are in contact slidingly with slanted cam surfaces 20A and 20B of movable base 20, and are in pressure-contact, due to the tension force of coil spring 23 with movable base 20. Further, rollers 22B are engaged with elongated guide grooves 20C provided on both sides of movable base 20 and fixed on stationary base 10. Therefore, cartridge-holder 21 can move vertically against movable base 20.

When inserting cartridge 2 into cartridge-holder 21, cartridge 2 is to be inserted in the direction of arrow B to the stop position in cartridge-holder 21 through an opening thereon, as shown in FIG. 9 (A). During the course of insertion of cartridge 2, shutter 3 of cartridge 2 is moved by the unillustrated shutter opening/closing mechanism, and opening 2C of cartridge 2 is opened, thus a part of photo-magnetic disk 1 inside is exposed.

When cartridge 2 comes near the stop position that is the final step of cartridge insertion course, a front edge of cartridge 2 touches pin 26A located at the tip of L-shaped lever 26 in the locking mechanism, and rotates the lever 26 clockwise against the urging force of a spring. Due to the rotation of the lever 26, pin 26B provided on the other end of the lever 26 is disengaged from locking claw 20D on movable base 20. Thereby, movable base 20 moves in the direction of arrow C, being urged by pressure force of pin 24A positioned at the tip of activating arm 24 that is urged by coil spring 25 and thereby is rotatable round shaft 24B. When cartridge 2 moves, rollers 22A and 22B provided on cartridge-holder 21 slide down along the slanted cam surfaces 20A and 20B, and concurrently with that, roller 22B goes down along guide groove 20C and movable base 20 is moved down entirely by the urging force of coil spring 23. This downward movement causes cartridge 2 contained in cartridge-holder 21 to go down and the hub portion of photo-magnetic disk 1 inside cartridge 2 is engaged with and fixed to clamper 5 at the top end of spindle motor shaft 4 in the photo-magnetic recording apparatus.

When ejecting cartridge 2, a switch for ejecting cartridge is turned on, and then motor M operates and causes pin 27 provided on gear G4 to rotate counterclockwise through the gear train of G1, G2, G3 and G4. The pin 27 presses claw portion 20E provided on one end of movable base 20 to move the movable base 20 in the direction opposite to aforesaid C. Due to the reverse movement of movable base 20, cartridge-holder 21 causes movable base 20 to move upward through the action opposite to that made in the aforesaid movement of cartridge-holder 21 so that movable base 20 returns to its initial position, and at the same time, cartridge-holder 21 closes shutter 3 of cartridge 2 and moves cartridge 2 in the direction opposite to that of arrow B. Thus, cartridge 2 becomes possible to be taken out at the entrance.

FIG. 10 (A) is a top view showing how an external magnetic field-generating device is supported and FIG. 10 (B) is a sectional side view thereof. The external magnetic field-generating device is supported on supporting member 28 rotatably and is urged by a spring. One end of the supporting member 28 is supported rotatably on stand 29 fixed on stationary base 10, while the center portion of the supporting member is linked with cartridge-holder 21. FIG. 10 (C) is a sectional view of the portion in the vicinity of the external magnetic field-generating device wherein cartridge 2 is in its lowered position.

FIGS. 11 (A) to 11 (C) are longitudinal sectional views of the center portion taken from a front view of the photo-magnetic disk driving apparatus and FIG. 11 (A) shows a view wherein a cartridge is not loaded. Under such conditions, cartridge-holder 21, which is capable of moving vertically, is in its raised position and external magnetic field-generating device 6 is positioned to be higher than the top surface of the cartridge-holder 6.

FIG. 11 (B) is a sectional view showing the process of how cartridge 2 is loaded. In this process, the lower surface of external magnetic field-generating device 6 is positioned to be away from the upper edge of insertion path for cartridge 2 by the distance P.

FIG. 11 (C) shows a state wherein cartridge 2 has been loaded to its prescribed stop position When cartridge 2 is in its lowered position, external magnetic field-generating device 6 is in its prescribed position, which is in the vicinity of the obverse of photo-magnetic disk 1, through opening 21A of cartridge-holder 21, as well as through an opening of cartridge 2 and an opening of shutter 3.

In aforesaid photo-magnetic disk driving apparatus, the external magnetic field-generating device is required to be provided at a position higher than the upper stop position for the cartridge-holder that moves vertically. Therefore, it is necessary to prepare sufficient upper space, which makes it impossible to develop a small-sized driving apparatus. Further, when playing back and recording, the moving distance from the upper stop position to the lower set position to be close to the photo-magnetic disk is great, which causes problems of greater pressing force and impact force.

SUMMARY OF THE INVENTION

The present invention has been devised to solve the problems mentioned above, and its object is to provide a photo-magnetic disk driving apparatus wherein the support of an external magnetic field-generating device can be made small through a simple structure.

In the first example of a photo-magnetic disk driving apparatus of the invention for attaining the above-mentioned object, a photo-magnetic recording apparatus is equipped with an external magnetic field-generating device that generates a magnetic field perpendicular to the recording surface of a photo-magnetic disk and with a light-irradiating means that raises temperature partially on the recording surface of aforesaid photo-magnetic disk. At least one of recording, playing back and erasing of information is performed with a cartridge containing the photo-magnetic disk therein, being inserted in the photo-magnetic recording apparatus. The apparatus includes a supporting means that supports the aforesaid external magnetic field-generating device movably, a retracting means that retracts the aforesaid external magnetic field-generating device from the space forming the loading path for the aforesaid cartridge or for a member that is united with the cartridge, and a moving means that moves the aforesaid external magnetic field-generating device to the position where recording on aforesaid photo-magnetic disk and playing back therefrom can be done. The aforesaid external magnetic field-generating device is arranged so that it enters the space which forms the aforesaid loading path when the aforesaid cartridge is not inserted in the aforesaid loading path.

Further, the present first example is characterized in that the aforesaid external magnetic field-generating device is retracted, by aforesaid retracting means, from the space forming aforesaid loading path when the aforesaid cartridge is loaded in the photo-magnetic recording apparatus, and aforesaid external magnetic field-generating device is moved, by aforesaid moving means, to the position of recording and playing back when aforesaid cartridge is in the position where recording and playing back can be done. Thus, aforesaid can be attained.

Further, the first embodiment is characterized in that a holding member that holds aforesaid cartridge in a insertable manner, a retracting means for retracting aforesaid external magnetic field-generating device from aforesaid cartridge insertion advancing path, a moving means for moving the external magnetic field-generating device from the retracted position by means of the retracting means to the position for recording and playing back or to the standby position for cartridge insertion, and a guide member for guiding aforesaid holding member, for back and forth movement from the cartridge loading position to the position for recording and playing back, are provided.

The first embodiment of the invention is further characterized in that aforesaid external magnetic field-generating device is set to the position for recording and playing back by the movement of a cartridge or a moving member that moves together with the cartridge when the cartridge is loaded, and by aforesaid moving member when aforesaid retracting means is operated for retracting to the retraction position and thus the cartridge has been loaded, and thereby aforesaid object can be attained.

Further, the first embodiment is characterized in that, after aforesaid cartridge has been loaded, aforesaid holding member is lowered along a guide member by the cartridge or a moving member that moves together with the cartridge, and concurrently with that, the external magnetic field-generating device is set to the position for recording and playing back.

A photo-magnetic disk driving apparatus of the invention for attaining aforesaid object has a second embodiment wherein a photo-magnetic recording apparatus comprises an external magnetic field-generating device that generates a magnetic field perpendicular to a recording surface of a photo-magnetic disk and a light-irradiating means that raises partially the temperature on the recording surface of aforesaid photo-magnetic disk. The apparatus performs at least one of recording, playing back and erasing of information with a cartridge containing therein aforesaid photo-magnetic disk loaded in a photo-magnetic recording apparatus. The second embodiment is characterized in that a retracting means that retracts a cartridge-holder, which moves together with a cartridge when aforesaid cartridge is inserted, and aforesaid external magnetic field-generating device from the insertion path for cartridge-holder and cartridge to the retraction position, a moving means for moving aforesaid external magnetic field-generating device from aforesaid retraction position to the recording position or to the standby position when the cartridge is not inserted, and a guide member for controlling the movement of the cartridge-holder when moving the cartridge-holder to the recording position. A pressing member fixed on the cartridge holder touches the external magnetic field-generating device or a member fixed on the external magnetic field-generating device when the cartridge moves. Thereby the external magnetic field-generating device is retracted from the insertion path for a cartridge holder by the pressing force of the pressing member, while when the cartridge holder is fixed to the recordable position for the photo-magnetic disk, the external magnetic field-generating device is released from aforesaid pressing force and is moved by aforesaid moving means to the recording position to be set thereto.

The second example is further characterized in that aforesaid external magnetic field-generating device is moveably supported on the fixing base of a main body of the apparatus and is urged by a spring.

BRIEF DESCRIPTION OF THE DRAWINGS

FIG. 13 is a side view of FIG. 12.

FIG. 14 is a sectional view of FIG. 12 taken on a longitudinal central line in a top view of the driving apparatus. FIG. 15 is a perspective view of a cartridge holder.

DETAILED DESCRIPTION OF THE INVENTION

The invention will be explained as follows, referring to the illustrated examples. It is noted that FIGS. 6 (A) and 6 (B) show an example of a photo-magnetic disk cartridge used in the photo-magnetic disk driving apparatus of the invention wherein FIG. 6 (A) is a top view with the shutter closed and FIG. 6 (B) is a top view with the shutter opened.

Figure 6A:
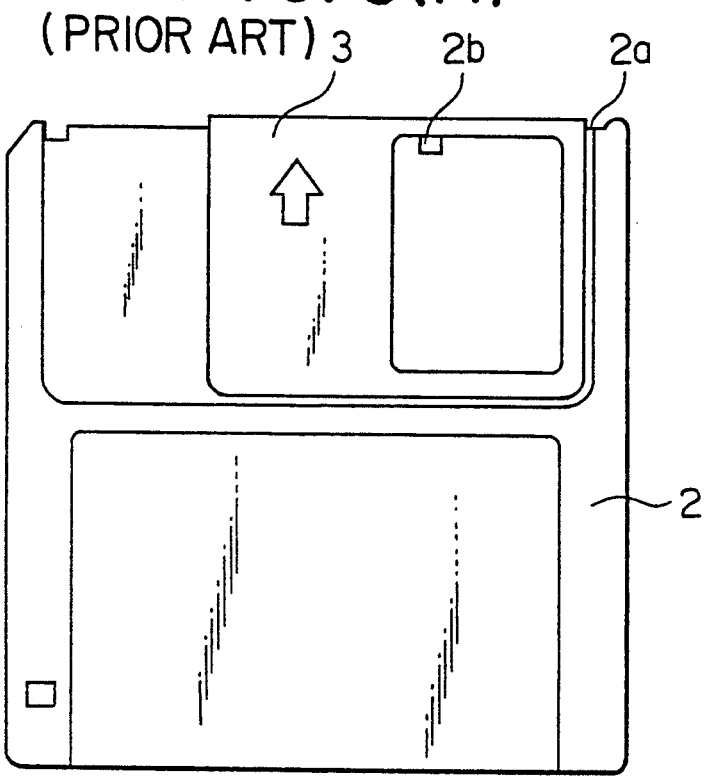
FIGS. 6 (A) and 6 (B) represent top views showing an example of a photo-magnetic disk cartridge used in the driving apparatus of the invention wherein a shutter is closed and opened, respectively.
Figure 6B:
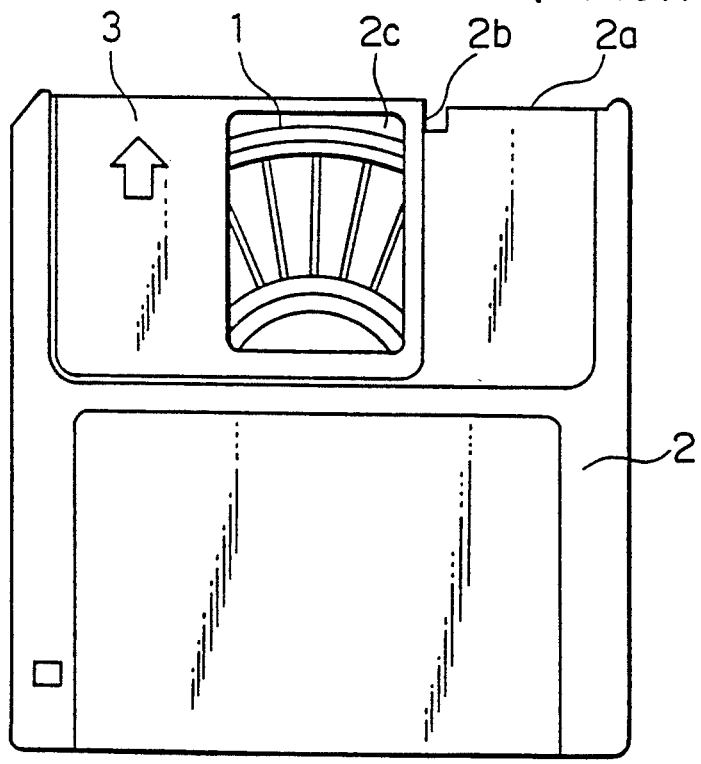
Figure 7A:
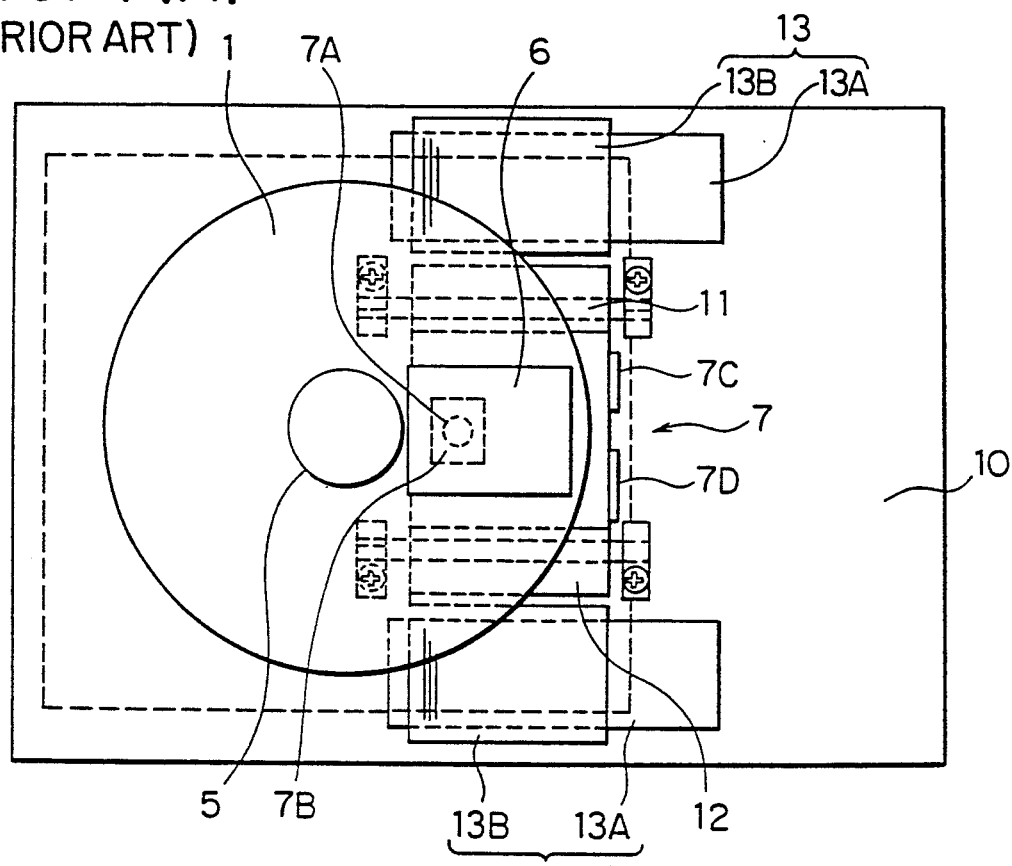
FIGS. 7 (A) and 7 (B) represent a top view of a conventional photo-magnetic disk driving apparatus and a sectional view taken on central and lateral line in the top view, respectively.
Figure 7B:
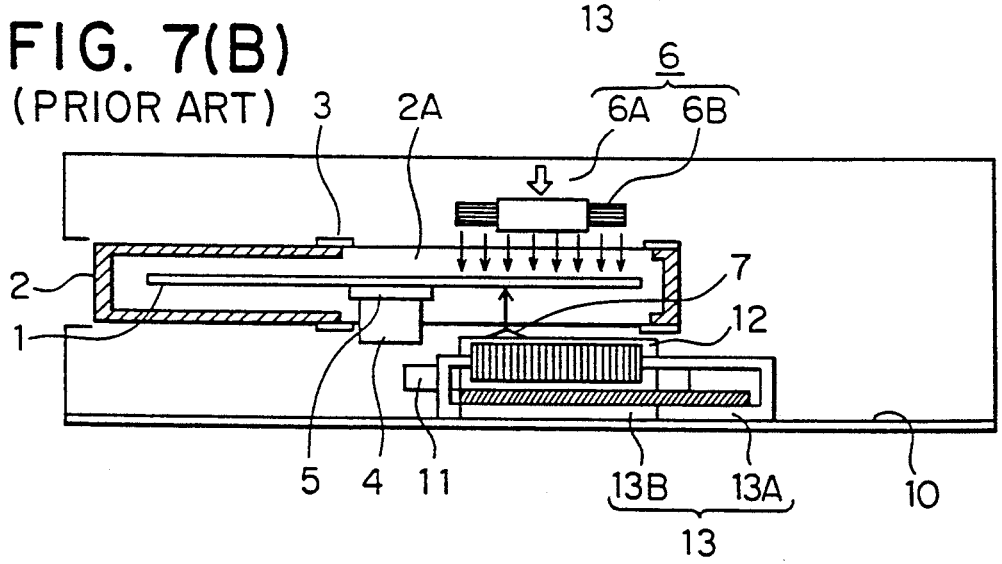
Figure 8:
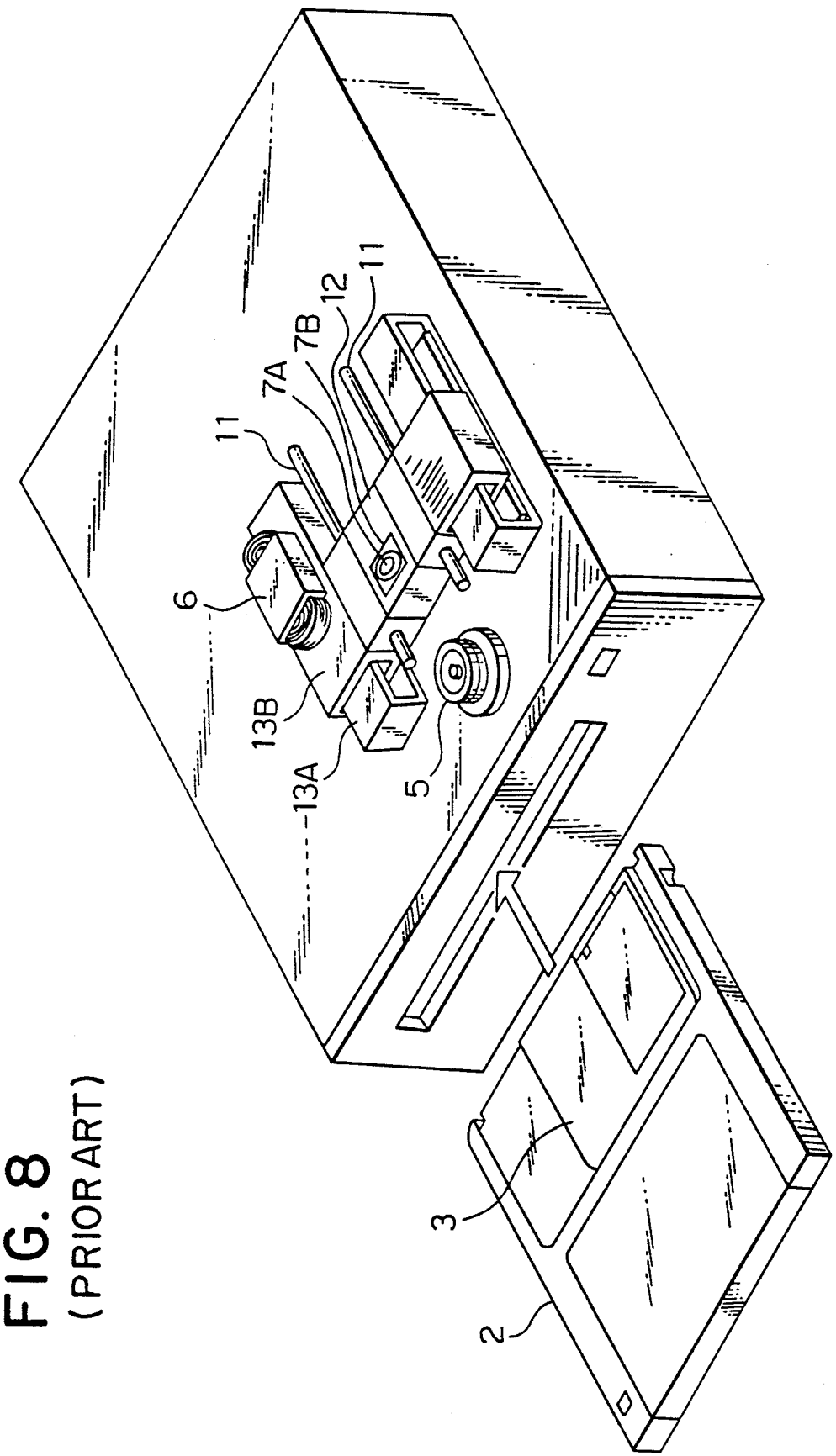
FIG. 8 a perspective view showing the photo-magnetic disk and its driving apparatus of FIGS. 7(A) and 7(B).
Figures 9A, 9B:
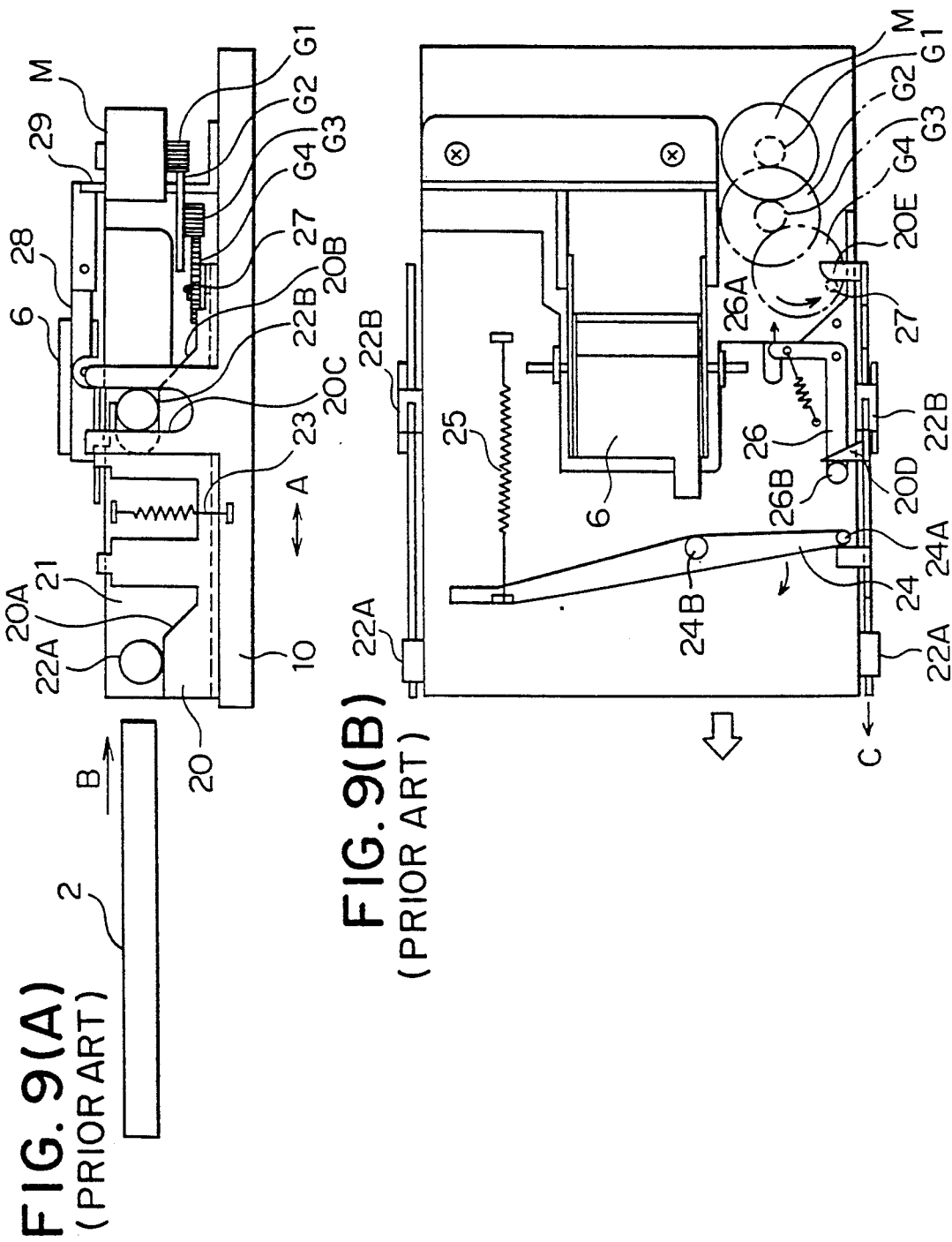
FIGS. 9 (A) and 9 (B) represent a side view and a top view of a conventional driving apparatus.
Figure 10A:
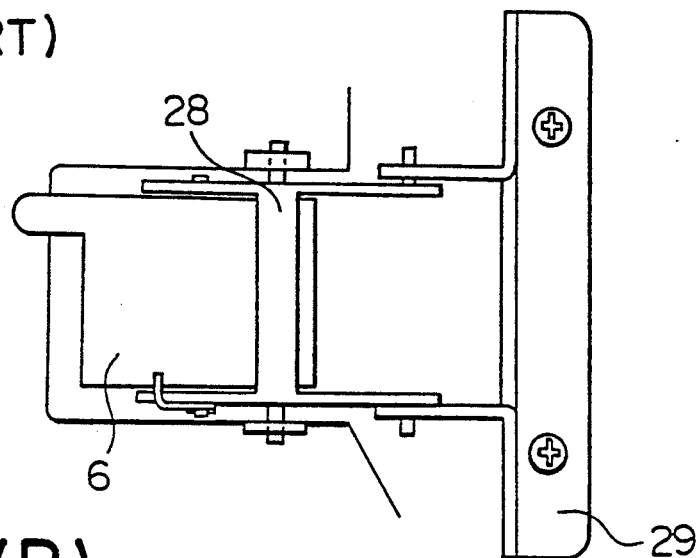
FIGS. 10 (A) represents a top view and FIGS. 10 (B) and 10 (C) represent a side view of a portion in the vicinity of an external magnetic field-generating device of the conventional driving apparatus.
Figure 10B:
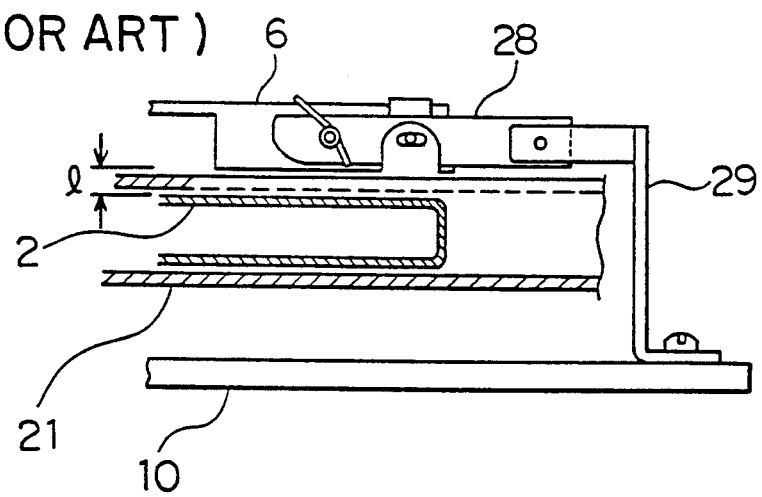
Figure 10C:
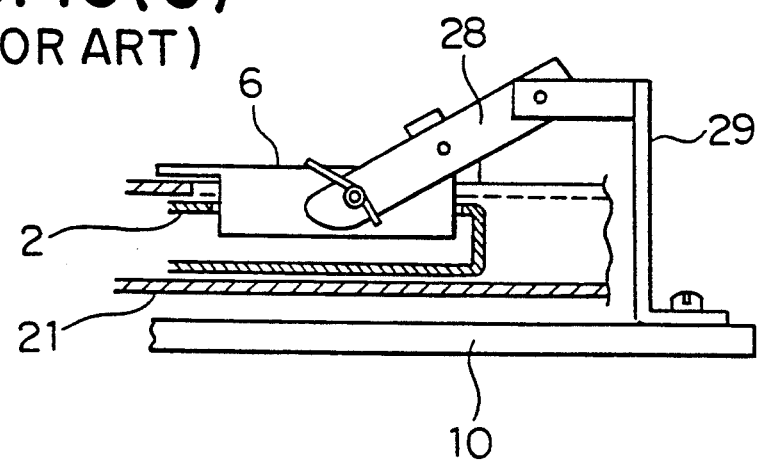

In these drawings, the numeral 2 is a cartridge holding photo-magnetic disk 1, 2a is a front edge of cartridge 2, 2b is a groove portion for insertion locking provided on front edge 2a for cartridge 2, 2c is an opening portion of the cartridge, 3 is a shutter mounted on cartridge 2 and is urged by a spring to cause its closed state as shown in FIG. 6 (A) and is further capable of sliding to its opened state as shown in FIG. 6 (B), and the numeral 1 is a photo-magnetic disk held in cartridge 2.

Figure 1:
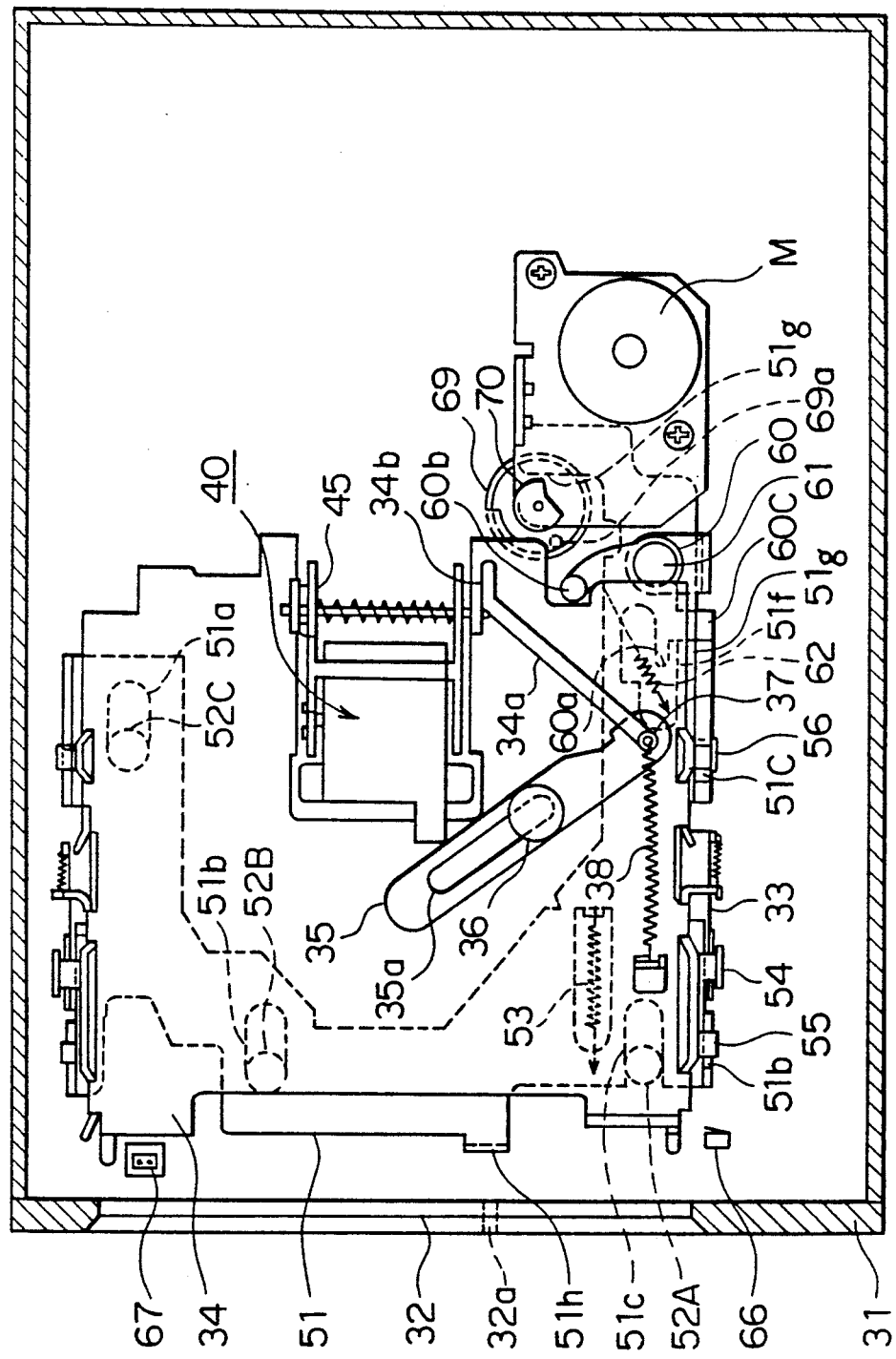
FIG. 1 is a top view showing an example of the photo-magnetic disk driving apparatus of the invention.
Figure 2:
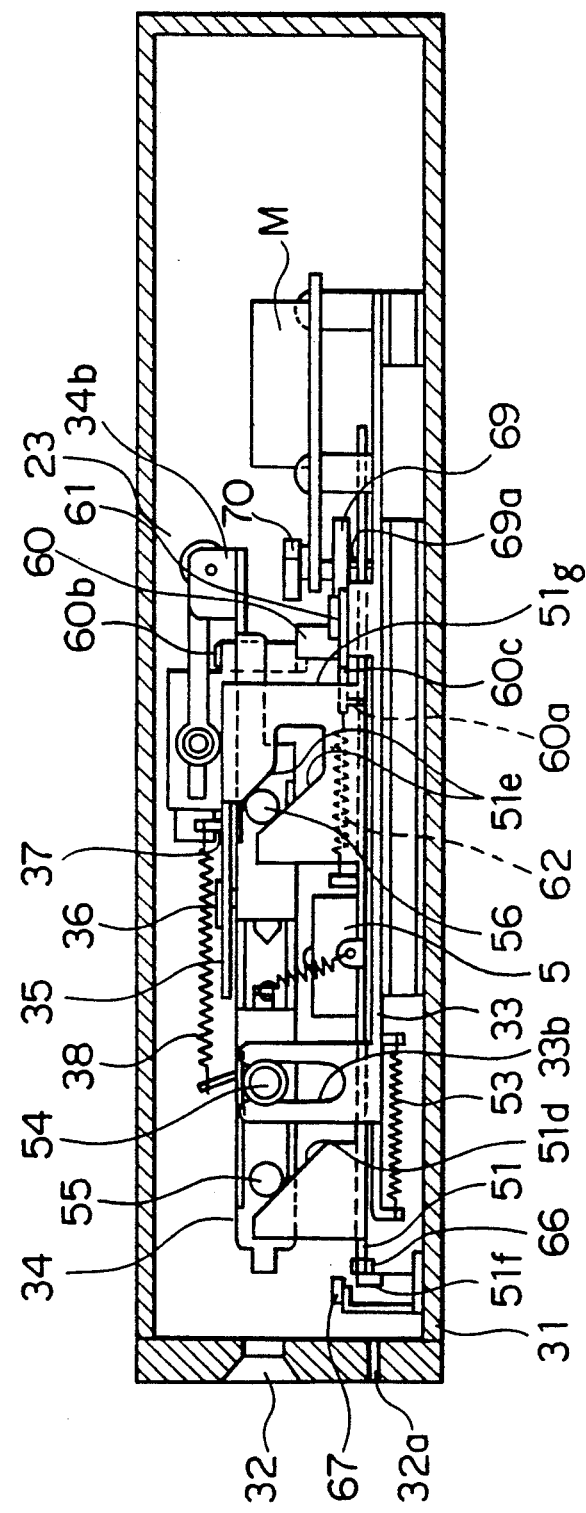
FIG. 2 is a side view of FIG. 1
Figure 3:
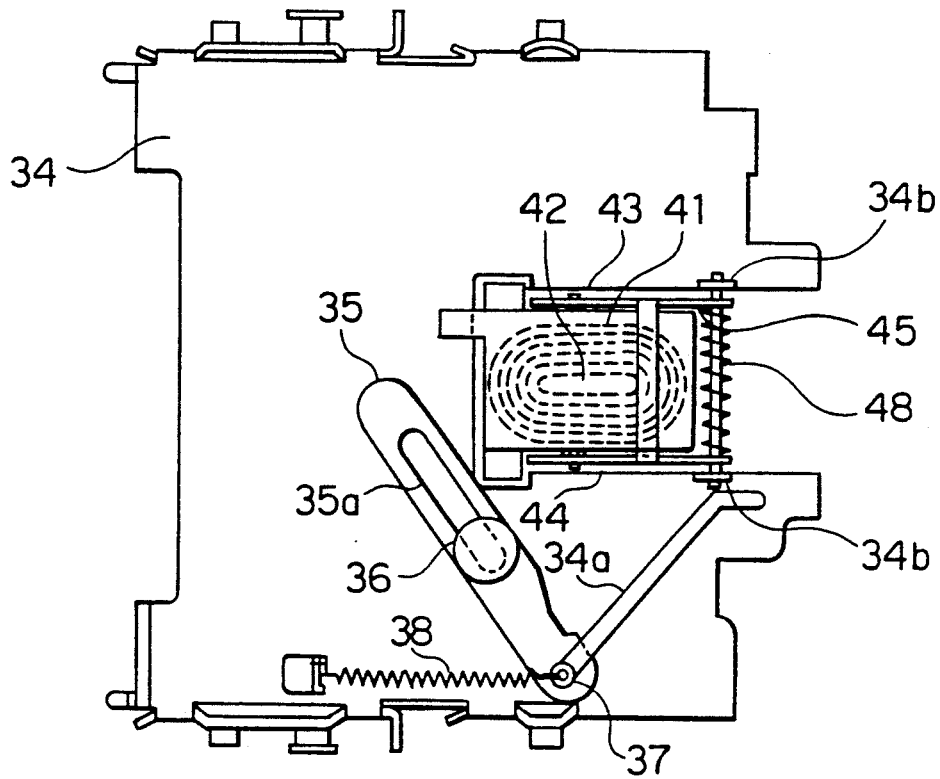
FIG. 3 is a partial top view showing a cartridge holder and an external magnetic field-generating device.
Figure 4:
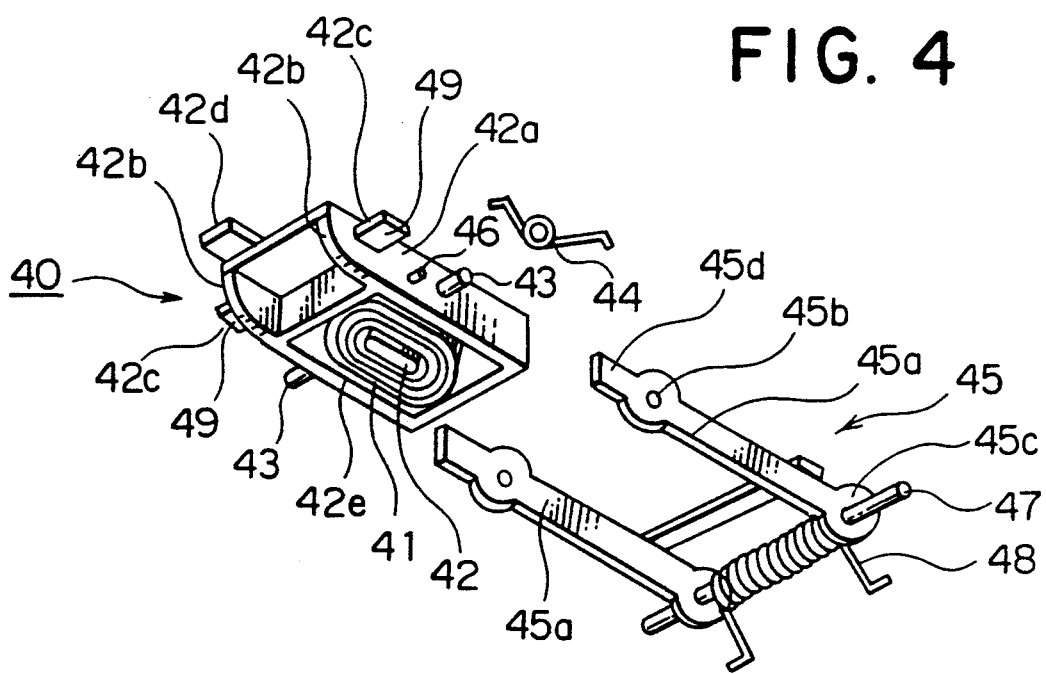
FIG. 4 is an exploded perspective view showing the external magnetic field-generating device and a supporting member for FIG. 3.

In FIGS. 1 and 2, the numeral 31 is an apparatus frame, 32 is an inlet for inserting aforesaid cartridge 2 in the arrowed direction upward shown with an arrow, 33 is a fixing frame that is solidly combined with apparatus frame 31. The numeral 34 is a cartridge holder that receives a cartridge to the position where the cartridge can be engaged with clamper 5, which is rotated by spindle motor shaft 4 for driving a disk attached to fixing frame 33. On the top face of aforesaid cartridge holder 34, there are provided operating member 35 for opening and closing shutter 3 provided on cartridge 2 and ejecting cartridge 2, and an external magnetic field-generating device which will be mentioned later and is used when writing information into photo-magnetic disk 1.

Operating member 35 is mounted on cartridge holder 34 in a slidable and rotatable manner through the engagement of elongated hole 35a provided on the operating member and flat-headed pin 36 studded on cartridge holder 34. Actuating pin 37 studded on the tip of operating member 35 is engaged with guide groove 34a provided on cartridge holder 34 in a slidable manner and is urged by spring 38 so that actuating pin 37 is positioned to the insertion side of guide groove 34.

External magnetic field-generating device 40 is composed of magnetic coil 41 and yoke 42 around which magnetic coil 41 is wound. Each of both sides of yoke body 42a of yoke 42 is provided with pin 43. Each pin 43 is engaged with hole 45b of each supporting arm 45a on one end of supporting member 45, that in turn is supported rotatably on bent portion 34b of cartridge holder 34. Thus yoke 42 is rotatably supported. Spring 44 is arranged around aforesaid pin 43, thereby the tip portion of yoke 42 is urged to rotate toward cartridge holder 34.

Owing to shaft 47 engaged in hole 45c at another end of supporting arm 45a of aforesaid supporting member 45 and in a hole of bent portion 34b of aforesaid cartridge holder 34, supporting member 45 is supported rotatably and is urged toward one side by spring 48.

Tip curved surface portion 42b on one side of frame body of aforesaid yoke 42 has a smooth curved surface of a sleigh shape and is in smooth transition with flat-shaped bottom portion 42e. On each side of aforesaid frame body 42a, there is provided protrusively and solidly the stationary position regulating plate 42c, and on the top face at the tip there is provided protrusively and solidly the tip position regulating plate 42d. On the lower surface of aforesaid stationary position regulating plate 42c, shock absorbing member 49 such as rubber material or resin material is glued or coated to protect the top face of cartridge 2 against damage which may be caused by the lower surface of the stationary position regulating plate when cartridge 2 is loaded. Incidentally, stopper pin 46 fixed on one side of frame body 42a controls the movement of the frame body 42a and touches the lower surface of aforesaid supporting arm 45a.

Next, movable base 51 is movable from side to side within a range of the length of straight grooves 51a, 51b and 51c provided thereon, through a sliding engagement of straight grooves 51a, 51b and 51c and guide pins 52A, 52B and 52C, which are embedded in stationary frame 33. The moveable base 51 is urged toward the left side by spring 53 hooked between stationary frame 33 and the movable base, and it can move up-and-down from the illustrated upper position, where the cartridge 2 can be ejected or inserted. Up-and down movement is provided by means of roller 54 of cartridge holder 34, that is engaged with vertical guide groove 33b provided on stationary frame 33, and by rollers 55 and 56 which are in pressure-contact with inclined cams 51d and 51e. In the lower position, the photo-magnetic disk 1 is engaged with clamper 5.

The numeral 60 is an upper position locking member which has locking pin 60a and releasing pin 60b and is supported rotatably by shaft pin 61 embedded in stationary frame 33, and is urged counterclockwise in FIG. 1 by spring 59 hooked between stationary frame 33 and the upper position locking member. Incidentally, cam portions 51d and 51e on movable base 51 and vertical guide grooves 33b on stationary frame 33 are provided on both sides of cartridge holder 34 to be symmetrical.

The state shown in FIGS. 1 and 2, wherein locking pin 60a of upper position locking member 60 is engaged with locking-step 51f of movable base 51, represents a state wherein the movement of movable base 51 toward the right side against the urging force of spring 53 is held by upper position regulating member 60, and cartridge holder 34 is supported by cam portions 51d and 51e of movable base 51 at the upper position that is identical in level to inlet 32 and enables the cartridge to be inserted or withdrawn. Under such condition wherein photo-magnetic disk 1 is not inserted, external magnetic field-generating device 40 is in a state shown in FIG. 5 (A). Under such condition, supporting member 45 is urged by spring 48 to rotate counterclockwise, and yoke 42 is further urged to rotate by spring 44, thus, tip position regulating plate 42d touches the upper face of cartridge holder 34 and external magnetic field-generating device 40 is held horizontally at the lower stop position.

Figure 5A:
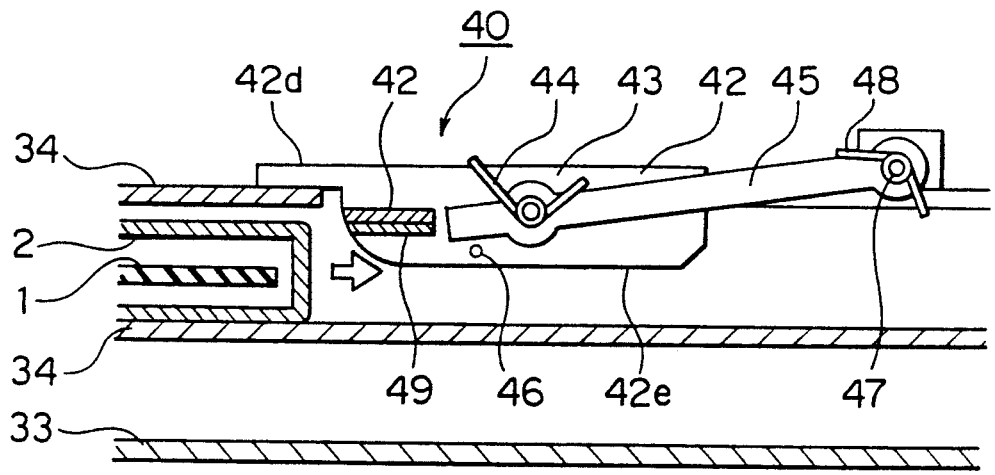
FIGS. 5 (A) to 5 (C) are enlarged sectional views illustrating a moving process of the external magnetic field-generating device linked with loading and unloading of a cartridge.
Figure 5B:
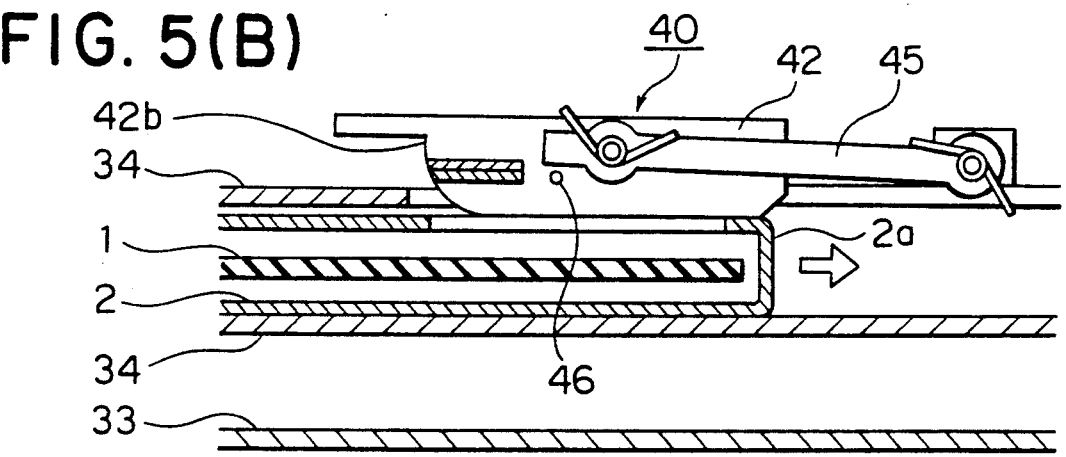
Figure 5C:
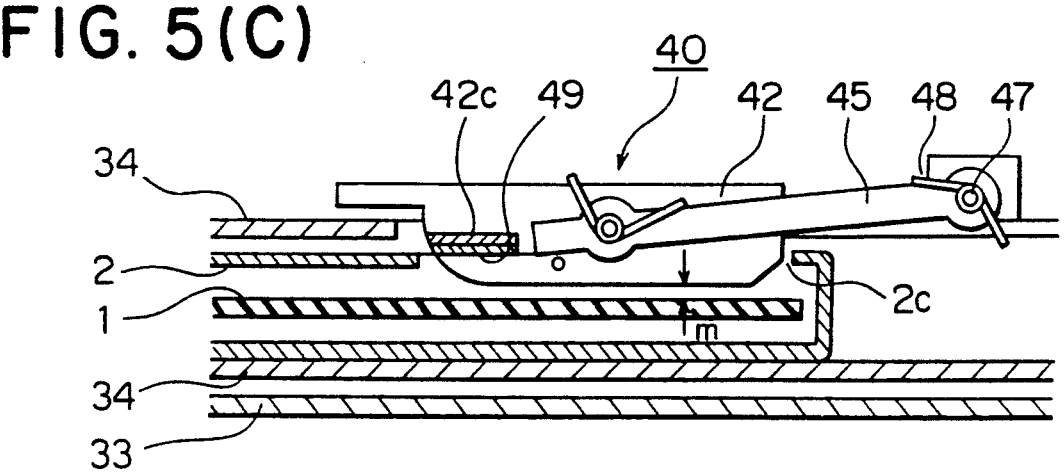

FIGS. 5 (A), (B) and (C) represent enlarged sectional views illustrating the insertion process of cartridge 2 and movement of external magnetic field-generating device 40.

When cartridge 2 is pushed into cartridge holder 34 that is in aforesaid state through inlet 32, front edge 2a of cartridge 2 pushes actuating pin 37 of operating member 35 against the urging force of spring 38 toward the right upper position following guide groove 34a in FIG. 1. Thereby, actuating pin 37 pushes the right edge of protruded portion of shutter 3 protruded upward beyond the front edge 2a of cartridge 2 in FIG. 6 to the left side, and thereby opens shutter 3 as shown in FIG. 6 (B) and stops after dropping into groove 2b on front edge 2a.

Further, in the aforesaid insertion process of cartridge 2, when cartridge 2 is fed in the arrowed direction in FIG. 5 (B), front edge 2a of cartridge 2 touches tip curved surface portion 42b and moves upward yoke 42, which is urged and supported by a spring.

When cartridge 2 is further pushed in, the top face of cartridge 2 touches flat-shaped bottom portion 42e of aforesaid yoke 42 to slide thereon, and cartridge 2 advances while external magnetic field-generating device 40 is kept at its upper position. In this case, stopper pin (rotation-preventing pin) 46 touches front protruded plate portion 45d of supporting member 45, thereby frame body 42a of yoke 42 is prevented from rotating counterclockwise excessively against supporting member 45.

When cartridge 2 is further inserted, external magnetic field-generating device 40 passes over opening portion (window) 2c of cartridge 2. During this passage, touching and sliding of the top face of cartridge 2 are not regulated. Therefore, flat-shaped bottom portion 42e of yoke frame body 42c on external magnetic field-generating device is urged by a spring to drop into opening portion 2c and stops at a position close to the top surface of photo-magnetic disk 1. Namely, supporting member 45 is urged by spring 48 and is rotated counterclockwise around shaft 47, thereby external magnetic field-generating device 40 is lowered and is finally stopped and fixed when stationary position regulating plate 42c and shock absorbing member 49 touch the top surface of cartridge 2. In this case, shock absorbing member 49 provided on the bottom surface of stationary position regulating plate 42c is effective to lower the vibration of external magnetic field-generating device 40. In this case of fixing, the lower surface of external magnetic field-generating device 40 is kept at an optimum position of predetermined distance m from the top face (recording and playing back surface) of photo-magnetic disk 2, and is fixed.

Owing to the above, external magnetic field-generating device 40 can be supported accurately at a position that is in parallel with the top surface of photo-magnetic disk 2 and is close thereto. Therefore, it is possible to cause external magnetic field-generating device 40 to operate effectively on photo-magnetic disk 2.

On the other hand, when cartridge 2 is pushed in and arrives almost at its stop position, front edge 2a pushes release pin 60b of upper position locking member 60, thereby upper position locking member 60 is caused to rotate clockwise in FIG. 1 against the rotating force of spring 62. As a result locking pin 60a is disengaged from locking-step 51f of movable base 51. Thereby, movable base 51 is moved by spring 53 toward the left until the right side of each of straight grooves 51a, 51b and 51c touches each of guide pins 52C, 52B and 51A, respectively. Thereby, cam portions 51d and 51e cause cartridge holder 34 to drop to a position where photo-magnetic disk 1 is engaged with clamper 5. Thus, photo-magnetic disk 2 can be driven by a spindle motor.

Incidentally, owing to the illustrated example, the movement of movable base 51 caused by the force of aforesaid spring 53 is detected by sensor 66, such as a microswitch, and the drop of cartridge holder 34 with which photo-magnetic disk 1 engages with clamper 5 is detected by sensor 67, such as a microswitch. The detection by means of sensor 67 may either be a direct detection of cartridge holder 34 or a detection of cartridge 2 inserted in cartridge holder 34, as in the illustrated example.

As stated above, in order to take cartridge 2 out of the driving device, operating gear 69 is caused to make one turn by motor M for release through an unillustrated gear train. Hence, a portion to be pressed 51g of movable base 51 is pushed by pressing pin 69a embedded in operating gear 69. Alternatively, a front edge bent portion 51h of movable base 51 may be pushed by a bar inserted through push-bar-hole 32a provided on the front plate of apparatus frame 31 adjacent inlet 32. Incidentally, the numeral 70 is an operating cam for an unillustrated switch which stops motor M after operating gear 69 makes one turn.

When movable base 51 is pushed by pressing pin 69a of operating gear 69 or by a push bar and moved toward the right against the force of spring 53, cartridge holder 34 is raised by cam portions 51d and 51e and thereby photo-magnetic disk 1 is released from clamper 5. When locking-step 51f of movable base 51 exceeds the position of locking pin 60a of upper position locking member 60, upper position locking member 60 is rotated by the force of spring 62, counterclockwise in FIG. 1, such that locking pin 60a can be engaged with locking-step 51f.

Under the aforesaid state, when pressing pin 69a or the push bar stops pressing, the movement of movable base 51 toward the left side by means of spring 53 is blocked by engagement of locking pin 60a and locking-step 51f. Thereby, cartridge holder 34 is supported at the same level as of inlet 32.

Further, when cartridge holder 34 is raised, external magnetic field-generating device 40 returns to its initial state of FIG. 5 (A) after passing through the uppermost position of FIG. 5 (B), and then it stops. A counterclockwise rotation of aforesaid upper position locking member 60 causes releasing pin 60b to press front edge 2a of cartridge 2 and causes operating pin 37 of operating member 35 to move out of groove portion 2b. After operating pin 37 moves out of groove portion 2b, operating pin 37, being urged by spring 38, returns easily to its original position shown in FIG. 1 during which front edge 2a of cartridge 2 is pushed and a greater part of cartridge 2 is ejected out of inlet 32. After that, therefore, it is possible to take cartridge 2 out of inlet 32 easily.

Figure 11A:
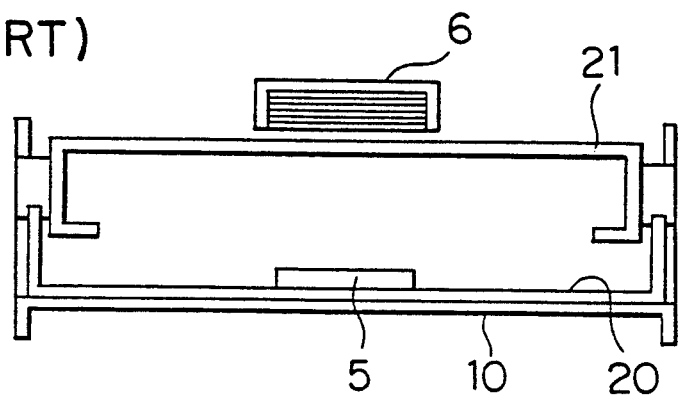
FIGS. 11 (A) to 11 (C) represent sectional views illustrating the up-and-down movement of the external magnetic field-generating device of FIGS. 10(A) and 10(C).
Figure 11B:
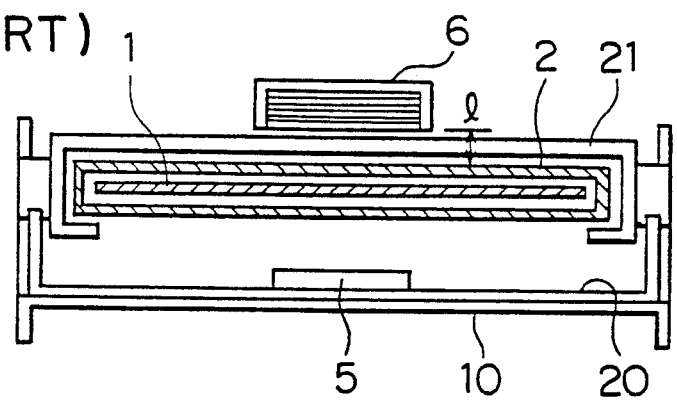
Figure 11C:
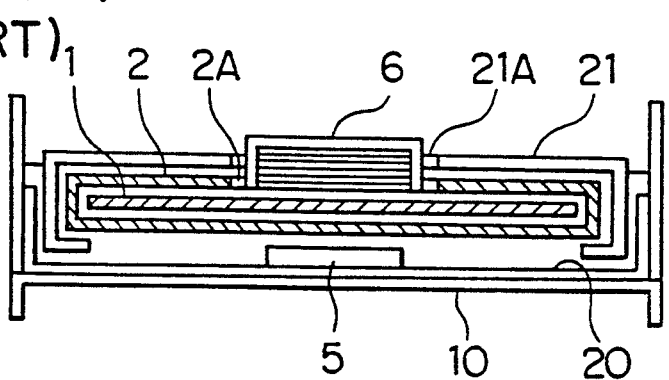

As stated above, the uppermost position of external magnetic field in FIG. 11 (A) in the conventional example has a required distance p from the top surface, resulting in an unnecessary space in a driving unit. On the contrary, an external magnetic field-generating device in the first example of a driving unit of the invention takes its uppermost position shown in FIG. 5 (B) wherein the top surface of cartridge 2 is in contact with the lower surface of the external magnetic field-generating device; namely, the minimum clearance between them is zero, which permits a small-sized apparatus.

Further, in the first example of a photo-magnetic disk driving apparatus of the invention, an external magnetic field-generating device can be moved vertically through a simple mechanism and a recording and playing back unit can be positioned to be in contact directly with the top surface of a cartridge. Therefore, it is possible to accurately maintain the degree of paralellization with the photo-magnetic disk and the distance therefrom, which is an excellent effect.

Figure 12:
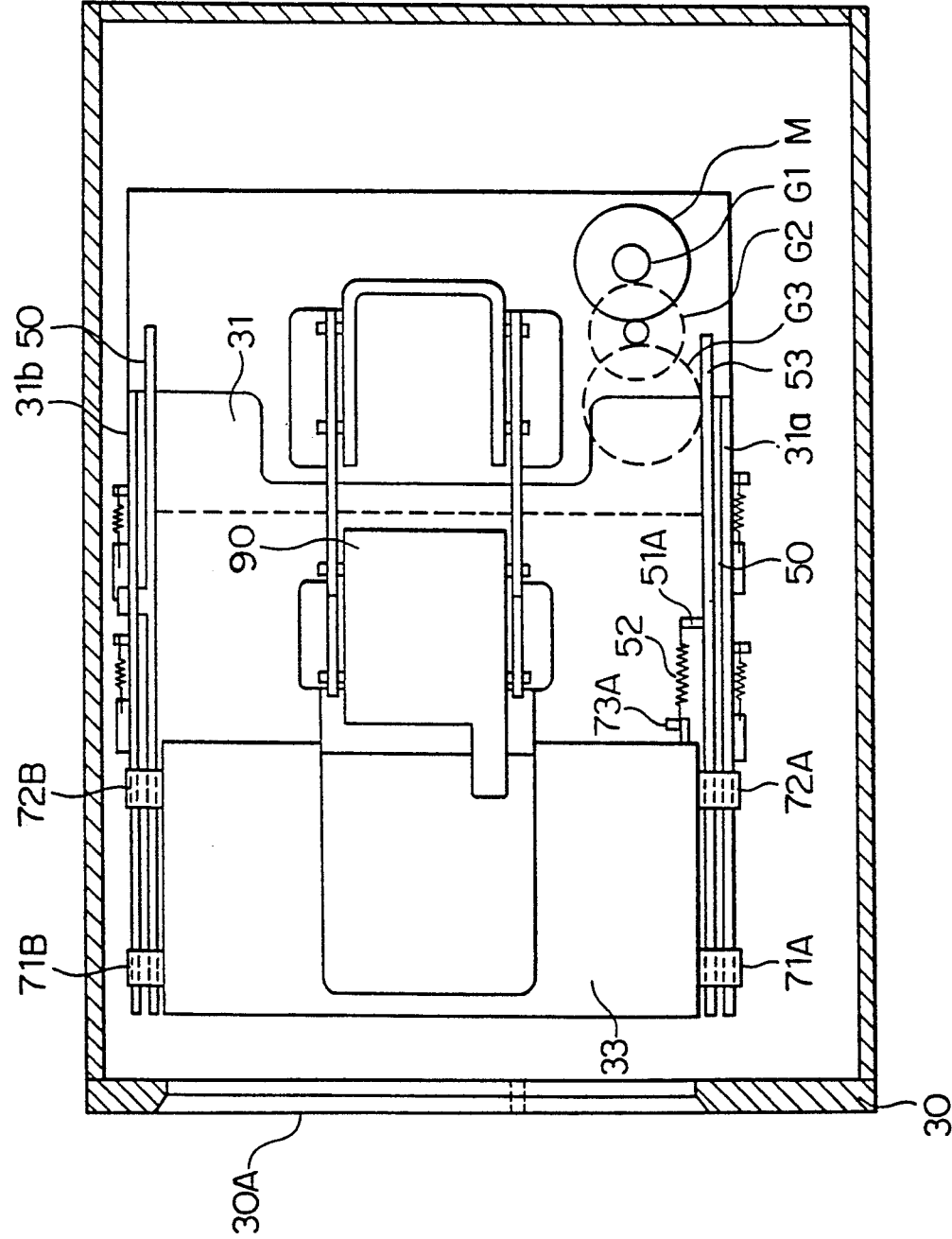
FIG. 12 is a top view showing an example of the photo-magnetic field-generating device of the invention.

FIG. 12 is a top view showing the second example of a photo-magnetic disk driving apparatus of the invention, FIG. 13 is its side view, FIG. 14 is a longitudinal sectional view taken along a central line on the top view of the driving apparatus, and FIG. 15 is a perspective view of a cartridge holder.

In these drawings, the numeral 30 is an apparatus frame whose front face is provided with inlet 30A through which aforesaid cartridge 2 is inserted upward in the arrowed direction.

Inside aforesaid apparatus frame 30, there is arranged a mechanical portion consisting of stationary base 31, movable base 50, cartridge holder 70, external magnetic field-generating device 90 and DC motor M for loading.

There is arranged movable base 50 in the manner that it can slide, through an unillustrated sliding mechanism, along guide plates 31a and 31b fixed on stationary base 31. On guide plate 31a, two groove cams 32A and 33A, each having an inclined surface and a descending surface are arranged. On guide plate 31b, there are arranged two similar groove cams 32B and 33B (not shown) each having an inclined surface and a descending surface symmetrical to the two groove cams mentioned above.

Two rollers 71A and 72A supported rotatably on the right side of cartridge holder 70 are engaged with groove cams 32A and 33A of aforesaid guide plate 31a to be capable of rotating and moving therein. Further, two similar rollers 71B and 72B supported rotatably on the left side of cartridge holder 70 are engaged with aforesaid groove cams 32B and 33B to be capable of rotating and moving therein. Thus, cartridge holder 70 can move diagonally along inclined surfaces of the groove cams of guide plates 31a and 31b and also descend.

Further, between protrusion 73A provided on cartridge holder 70 and protrusion 51A provided on movable base 50, there is stretched coil spring 34 and both protrusion are urged by the spring. Incidentally, rollers 71A and 72A supported rotatably on the right side of cartridge holder 70 are positioned to pass through elongated holes 52A and 53A prepared on the right side of movable base 50. On the other hand, rollers 71B and 72B supported rotatably on the left side of cartridge holder 70 are positioned to pass through elongated holes 52B and 53B prepared on the left side of movable base 50.

Figure 16:
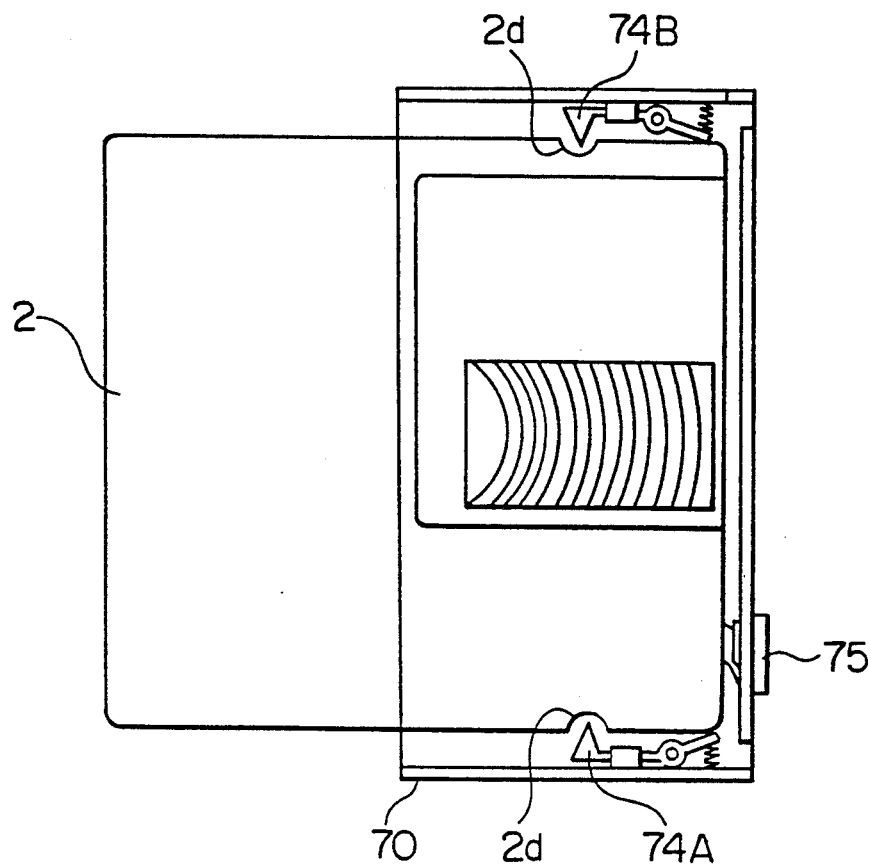
FIG. 16 is a partial top view showing the cartridge holder loaded with a cartridge.

Cartridge 2 is loaded in the arrowed direction into apparatus frame 30 of the photo-magnetic disk driving apparatus. In this insertion process, shutter 3 of cartridge 2 is opened by an unillustrated shutter-opening mechanism. After cartridge 2 arrives almost at the deepest point in cartridge holder 70, locking mechanisms at the right and the left having locking-claw-members 74A and 74B which are rotatably urged by a spring, as shown in a top view of FIG. 16, are pressed by front corner portions of cartridge 2 and then enter recessed portions 2d on both sides of cartridge 2 to thereby position and fix the cartridge. Concurrently with this, an actuator of microswitch 75 is pressed and thereby microswitch 75 is energized and DC motor for loading starts running. The motor M is connected, through gear trains G1, G2 and G3, to rack gear portion 53 of movable base 50, and concurrently with the start of running of motor M, movable base 50 starts moving toward the deep portion in apparatus frame 30 along an unillustrated sliding mechanism.

With the movement of movable base 50, the distance between aforesaid protrusion 73A and protrusion 51A becomes greater and thereby tensile force of spring coil spring 52 is applied on protrusion 73A. Due to the tensile force, cartridge holder 70 moves downward on the slant when rollers 71A, 72A, 71B and 72B roll along inclined surfaces of groove cams 32A, 33A, 32B and 33B in guide plates 31a and 31b.

When cartridge holder 70 moves downward on the slant as stated above and rollers 71A, 72A, 71B and 72B arrive at the lower end portions of the inclined surfaces of groove cams 32A, 33A, 32B and 33B, cartridge holder 70 stops moving. Thus, only movable base 50 moves, thereby stretching coil spring 52.

On the right side of guide plate 31a, locking members 34A and 35A are supported rotatably on supporting shafts 36A and 37A, respectively and are urged clockwise by springs 38A and 39A but are prevented from rotating by stopper pins 40A and 41A respectively. Likewise on guide plate 31b, there is provided an unillustrated roller locking mechanism consisting of the locking members, supporting shafts and springs, all of which are the same as the foregoing in structure.

Figure 17:
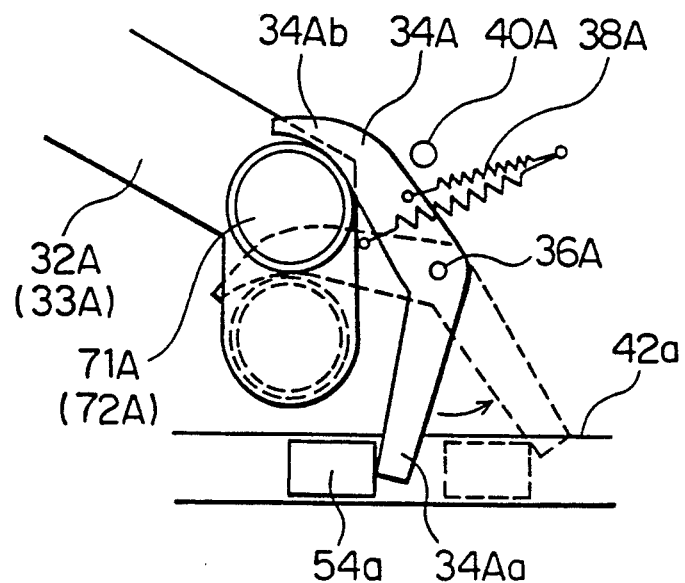
FIG. 17 is an enlarged side view showing a part of a roller-holding mechanism.

FIG. 17 is an enlarged side view showing a part of aforesaid roller locking mechanism wherein solid lines show the state in which roller 71A has arrived at the bottom end of an inclined surface of groove cam 32A and broken lines show the state in which roller 71A has arrived at the bottom end of a descending surface of aforesaid groove cam 32A.

On the other hand, in the vicinity of the lower end of movable base 50, protrusions 54a and 55a are protruded. When movable base 50 alone moves toward the right in FIG. 13, aforesaid protrusion 54a touches lower end portion 34Aa of aforesaid locking member 34A. When movable base 50 moves further to the right, locking member 34A rotates counterclockwise around fulcrum shaft 36A against the urging force of spring 38A and top end portion 34Ab of locking member 34A pushes down roller 71A which is in the lower end of the inclined surface of groove cam 32A.

Concurrently with the foregoing, the other protrusion 55a on movable base 50 touches the lower end portion of the other locking member 35A mentioned above, and rotates aforesaid locking member 35A and pushes down roller 72A along groove cam 33A, similarly to the foregoing. Likewise, on the left side of the driving unit, operations identical to the foregoing are conducted symmetrically.

Incidentally, for avoiding the interference between protrusion 55a and a lower end portion of locking member 36A, the top end of protrusion 55a is arranged to be low and the lower end portion of locking member 36A is arranged to be short. Further, 42a (42b) is a guide hole in a shape of an elongated groove provided in the vicinity of the lower portion of guide plate 31a (31b) through which aforesaid protrusions 54a and 55a can pass.

As stated above, when movable base 50 is moved, through gear trains and rack gears, toward the right by the driving rotation of DC motor for loading, cartridge holder 70 descends along groove cams 32A, 33A, 32B and 33B against the urging force of flat spring 56 that is provided on stationary base 31 and passes through the movable base and protrudes therefrom. The cartridge holder then arrives at position regulating plates 57 and 58 which serve as a sliding mechanism of movable base 50 and are fixed on stationary base 31 to be located at a position shown with broken lines in FIG. 14. In this case, the lower surface of cartridge holder 70 presses an actuator of microswitch 59 provided at a fixed position to cause an energized state, thus DC motor for loading stops running. In this case, photo-magnetic disk 1 in cartridge 2 contained in cartridge holder 70 is loaded and fixed in a clamper located at the tip of a spindle motor shaft.

Next, actions of an external magnetic field-generating device 90 to be made when a cartridge is inserted will be explained.

When a cartridge is not inserted, external magnetic field-generating device 90 is kept by position regulating plate 94 at the level that is equal to cartridge holder 70 in height.

Figure 18A:
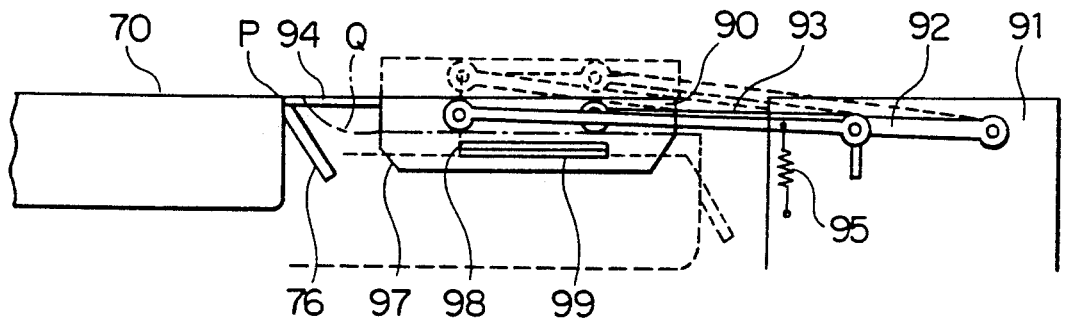
FIGS. 18 (A) to 18 (C) are side views showing the process of linkage of the insertion of cartridge holder and the external magnetic field-generating device.
Figure 18B:
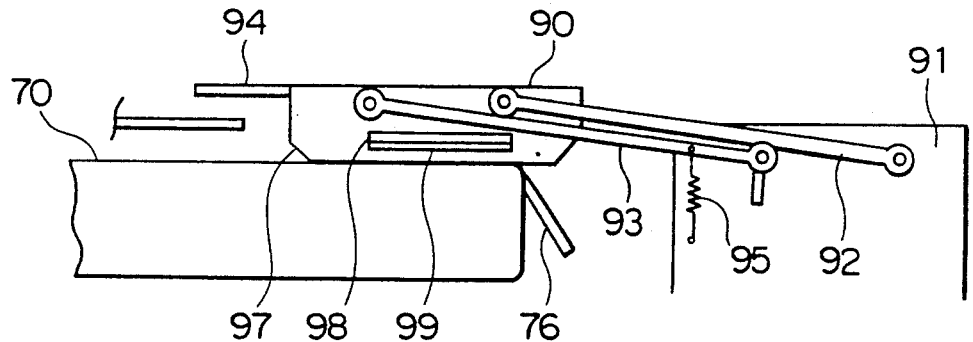
Figure 18C:
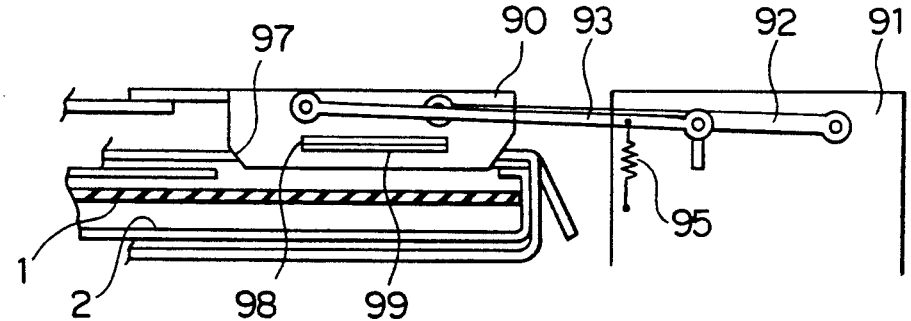

FIGS. 18 (A) to 18 (C) are side views showing the state wherein a cartridge is not initially inserted, and broken lines in the figure represent movements of each member made during the process of insertion of a cartridge.

External magnetic field-generating device 90 is connected rotatably to one end of each of a total four arms 92 and 93, two of them are supported rotatably on each side of stand member 91, thereby the external magnetic field-generating device can be moved in parallel like a pantograph. Further, external magnetic field-generating device 90 is urged counterclockwise by tension spring 95.

When DC motor M for loading starts running in the case of the insertion of cartridge 2, cartridge holder 70 starts moving along groove cams 32A, 33A, 32B and 33B of stationary base 31 as stated above. In FIG. 18 (A), a locus of uppermost points P of a tip portion of cartridge holder 70 is shown with dashed lines wherein a shape of a groove cam on a guide plate is made to be the same as that in FIG. 19. This locus becomes the same as a groove cam in shape.

Figure 19:
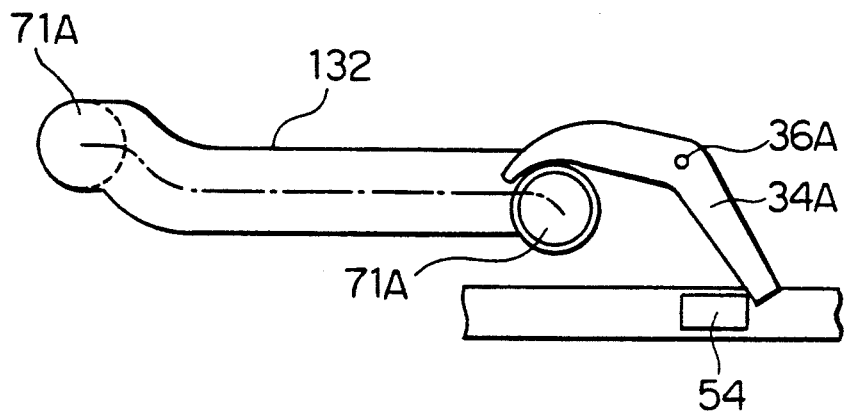
FIG. 19 is a partial side view showing another example of a groove cam.

FIG. 19 is a partial side view showing an example of a groove cam. The shape of this groove cam 132 is composed of a horizontal straight portion around the center thereof, rising curve portion at the left end thereof and descending curve portion at the right end thereof. Dashed lines in the figure represent a locus of movement of roller 71A that rolls in the groove cam 132.

Inserted cartridge holder 70, after it slightly travels horizontally keeping its highest position P, descends along the curved surface the a rising portion and further descends in the vicinity of a terminal point at the right end to finally stop at a position where roller 71A is held by locking member 34A.

Further, when cartridge holder 70 starts moving in this manner, an inclined surface of pressing member 76 provided on the front edge of cartridge holder 70 touches guide portion 97 of the frame body of external magnetic field-generating device 90, and thus, the external magnetic field-generating device 90 is pushed up. External magnetic field-generating device 90 which has been pushed up is further raised along the path formed by arms 92 and 93, which are kept in parallel. (See FIG. 18 (B).)

When cartridge holder 70 is fixed to the recording position, external magnetic field-generating device 90 passes through an opening of cartridge holder 70 for descending and enters opening 2c of cartridge 2, whose shutter 3 is opened, until stop position regulating plate 98 touches the top surface of cartridge holder 70, and stops to be capable of recording. (See FIG. 18 (C).)

On the surface of stop position regulating plate 98 that touches cartridge holder 70, an elastic member 99 is glued for inhibiting the vibration generated when external magnetic field-generating device 90 hits the cartridge 2.

When taking out cartridge 2, DC motor M starts its reverse running when an unillustrated injection button provided on apparatus frame 30 is pressed by an operator. After the motor M starts its reverse running, movable base 50 moves, protrusions 54 and 55 move toward the left, locking of locking members 34A and 35A is released, and locking members 34A and 35A are rotated clockwise by springs 38A and 39A. Thereby, rollers 71A and 72A are released and pushed up together with cartridge holder 70 by flat spring 56. After that, cartridge holder 70 moves toward the cartridge insertion inlet with rollers 71A and 72A regulated by elongated holes 52A and 53A together with the movement of movable base 50.

After cartridge holder 70 moves to its initial position, an operator, by taking out cartridge 2, can return the apparatus to the original state by removing from the recessed portion of the cartridge against the urging force of a spring of locking claw members 74A and 74B for the lock releasing. In this case, external magnetic field-generating device 90 can escape, due to guide portion 97, from opening 2c of cartridge 2 and from a window of cartridge holder 70 to return to the original state.

The method of urging external magnetic field-generating device 90 against lower cartridge holder 70 is not limited to that of the example in FIGS. 18 (A) to 18 (C).

Figure 20A:
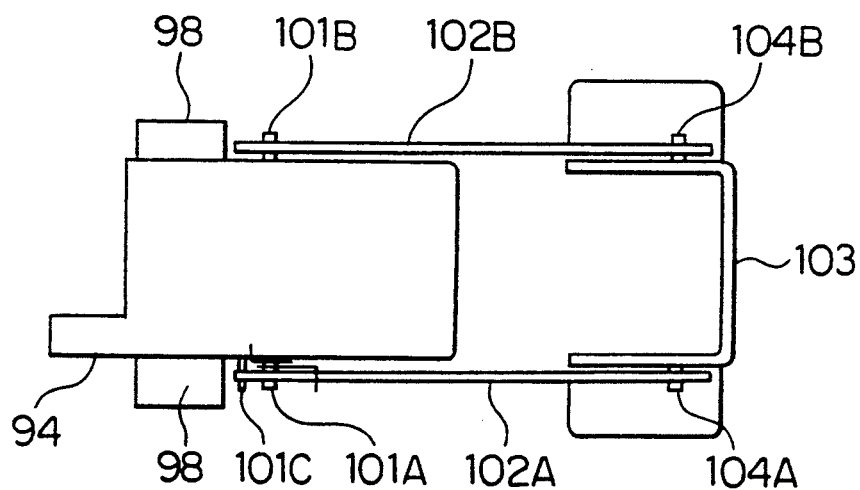
FIGS. 20 (A) and 20 (B) represent a top view and a side view showing another example of a holding-pressing means of an external magnetic field-generating device, respectively.
Figure 20B:
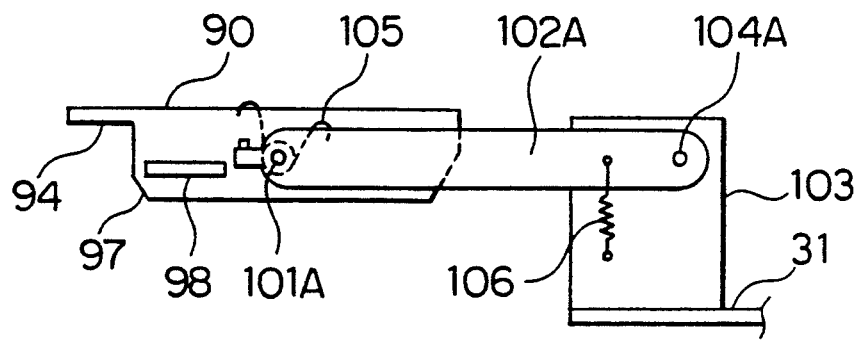

FIGS. 20 (A) and 20 (B) show another example of holding and pressing means for external magnetic field-generating device 90, wherein FIG. 20 (A) is a top view and FIG. 20 (B) is a side view. External magnetic field-generating device 90 is supported on ends of arms 102A and 102B which engage with fixed pins 101A and 101B and are attached rotatably. External magnetic field-generating device 90 is urged counterclockwise by coil springs 105 hooked on arms 102A and 102B.

Other ends of aforesaid arms 102A and 102B are engaged rotatably with shafts 104A and 104B provided on stand member 103 fixed on stationary base 31. Aforesaid arms 101A and 101B are urged counterclockwise by spring 106. Further, rotation-preventing pin 101C prevents the external magnetic field-generating device from rotating excessively clockwise by a propulsive force of a cartridge holder.

Incidentally, items having the same functions as those in aforesaid example among structural members in external magnetic field-generating device 90 are given the same symbols. The external magnetic field-generating device 90 moves vertically in a sliding manner, being linked with the movement of cartridge holder 70 for insertion thereof.

Figure 21A:
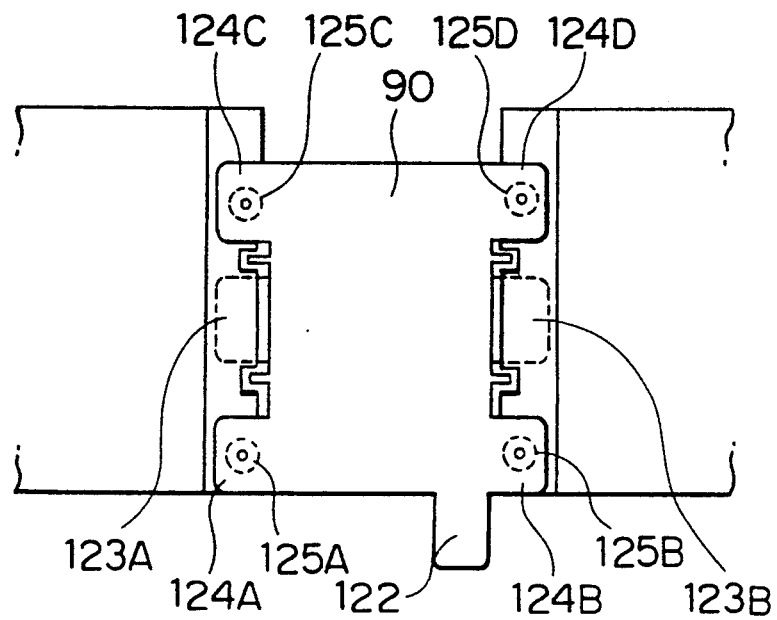
FIGS. 21 (A) and 21 (B) represent a top view and a side view showing another example of a holding-pressing means of an external magnetic field-generating device, respectively.
Figure 21B:
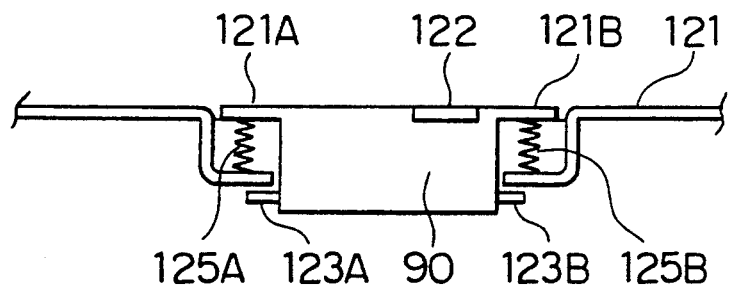

FIGS. 21(A) and 21(B) show another example of a holding and pressing means for the external magnetic field-generating device of the invention, wherein FIG. 21 (A) is a top view and FIG. 21 (B) is a side view.

In this example, aforesaid stand member and arms are not included but a recessed portion is formed on an area of holding member 121, which is fixed on stationary base 31. Within the area is provided the holding external magnetic field-generating device 90. External magnetic field-generating device 90 is equipped with a position regulating plate 122, two stop position regulating plates 123A and 123B, and four spring-holding plates 124A, 124B, 124C and 124D. The external magnetic field-generating device is connected to and urged against holding member 121 through four springs 125A, 125B, 125C and 125D at four points between holding member 121 and spring-holding plates 124A, 124B, 124C and 124D.

Before insertion of cartridge holder 70, external magnetic field-generating device 90 is urged by four springs 125A, 125B, 125C and 125D to descend downward and is stopped with its position regulating plate 122 being in pressure-contact with a part of stationary base 121.

When cartridge holder 70 is inserted, it moves inward while its top surface pushes the external magnetic field-generating device 90 up.

When cartridge holder 70 arrives at its stop position, stationary position regulating plates 123A and 123B touch the prescribed portions of cartridge holder 70. Thus, external magnetic field-generating device 90 enters an opening of cartridge holder 70 and opening 2c of cartridge 2 and stops therein.

Figure 22:
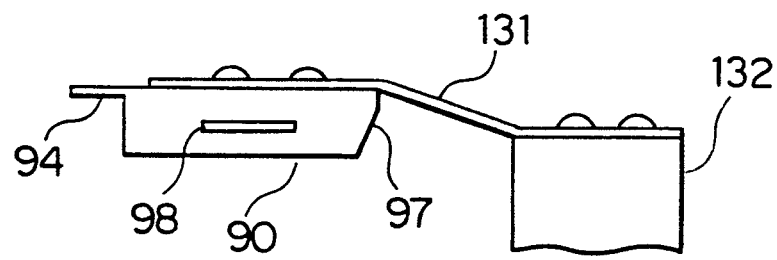
FIG. 22 is a side view showing still another example of a holding-pressing means of an external magnetic field-generating device.

FIG. 22 is a side view showing still another example of a holding and pressing means for an external magnetic field-generating device of the invention. In this example, stand member 132 and external magnetic field-generating device 90 are connected by one piece of flat spring 131 and external magnetic field-generating device 90 is urged by the spring. Thus, the external magnetic field-generating device can be moved vertically by a simple structure, which is a specific feature of this example.

As stated above, a driving unit has required an unnecessary space when a conventional external magnetic field-generating device is mounted on a cartridge holder. On the contrary, an external magnetic field-generating device in the second example of a driving unit of the invention is positioned at its lowest position when a cartridge is not inserted and when a cartridge has been loaded. Even when the cartridge is being inserted, its highest level is still only slightly higher than its lowest position. Therefore, it has become possible to make an apparatus to be thinner.

Further, in the second example of a photo-magnetic disk driving apparatus of the invention, an external magnetic field-generating device can be moved vertically through linkage with a movement of a cartridge holder. This means that an external magnetic field-generating device can be moved vertically by a simple mechanism and the recording and playing back position can be fixed by direct contact to the top surface of a cartridge. Therefore, the degree of paralellization with a photo-magnetic disk and the distance therefrom can be kept accurately, which is an excellent of the invention.

What is claimed is:

1. A photo-magnetic disk driving apparatus, comprising:
    means for driving a photo-magnetic disk contained within a cartridge when said photo-magnetic disk is at a driving position, the cartridge having a front edge;
    means for generating a magnetic field having a direction perpendicular to a surface of said photo-magnetic disk;
    means for irradiating a laser beam onto said surface of said photo-magnetic disk to increase a temperature of an irradiated portion of said surface;
    means for receiving said cartridge, said receiving means having a loading path located between the driving position and an inlet, the inlet being located at a side of the apparatus for inserting the cartridge; and
    means for moving said generating means between a first position where said generating means is located within said loading path and a second position where said generating means is located outside of said loading path, said generating means being located in said first position before said cartridge is received at said inlet by said receiving means; and
    wherein the front edge of the cartridge urges the moving means to the second position.

2. The apparatus of claim 1,
    wherein said generating means is located in said first position when said apparatus is operated for at least one of recording, playing back, and erasing information on said photo-magnetic disk, and said generating means is located in said second position when said cartridge is being received by said receiving means.

3. A photo-magnetic disk driving apparatus, comprising:
    means for driving a photo-magnetic disk contained within a cartridge when said photo-magnetic disk is at a driving position;
    means for generating a magnetic field having a direction perpendicular to a surface of said photo-magnetic disk;
    means for irradiating a laser beam onto said surface of said photo-magnetic disk to increase a temperature of an irradiated portion of said surface;
    means for receiving said cartridge, said receiving means having means for holding said cartridge and a loading path located between the driving position and an inlet, the inlet being located at a side of the apparatus for inserting the cartridge;
    means for supporting said generating means, said supporting means configured to support said generating means in a first position where said generating means is inserted into said cartridge and a second position where said generating means is located outside of said cartridge, said holding means having guiding means for moving said generating means between said first position and said second position;
    the supporting means being located in the first position before the cartridge is received at the inlet by the receiving means; and
    the holding means including a pushing member for pushing the generating means to the second position when the cartridge is being received by the receiving means.

4. The apparatus of claim 3,
    wherein said guiding means is configured to move said generating means to said second position by the movement of said holding means and said cartridge when said cartridge is being received by said receiving means, and said guiding means is further configured to move said generating means to said first position by the movement of said holding means and said cartridge after said cartridge is received by said receiving means.

5. The apparatus of claim 3,
    wherein said pushing member is configured to stop pushing said generating means after said cartridge is received by said receiving means and said generating means is moved to said second position.

6. The apparatus of claim 5,
    wherein said supporting means includes a spring member biased to move said generating means back to said first position.

* * * * *